US 11,738,639 B2

(12) United States Patent
Marechal et al.

(10) Patent No.: US 11,738,639 B2
(45) Date of Patent: Aug. 29, 2023

(54) ELECTRIC VEHICLE PROPULSION SYSTEM (71) Applicant: VALEO EMBRAYAGES, Amiens (FR)

(72) Inventors: Olivier Marechal, Cergy Pontoise (FR); Benoit Couturier, Cergy Pontoise (FR)

(73) Assignee: VALEO EMBRAYAGES, Amiens (FR)

(*) Notice: Subject to any disclaimer, the term of this patent is extended or adjusted under 35 U.S.C. 154(b) by 0 days.

(21) Appl. No.: 17/265,428

(22) PCT Filed: Aug. 1, 2019

(86) PCT No.: PCT/EP2019/070834
§ 371 (c)(1),
(2) Date: Feb. 2, 2021

(87) PCT Pub. No.: WO2020/025774
PCT Pub. Date: Feb. 6, 2020

(65) Prior Publication Data
US 2021/0291643 A1 Sep. 23, 2021

(30) Foreign Application Priority Data

Aug. 3, 2018 (FR) .................................. 18 57279

(51) Int. Cl.
*B60K 17/16* (2006.01)
*B60K 1/02* (2006.01)
(Continued)

(52) U.S. Cl.
CPC ............... *B60K 17/16* (2013.01); *B60K 1/02* (2013.01); *B60K 17/02* (2013.01); *F16H 3/089* (2013.01);
(Continued)

(58) Field of Classification Search
CPC ................ F16H 3/089; F16H 37/0813; F16H 2003/0811; F16H 2200/0021;
(Continued)

(56) References Cited

U.S. PATENT DOCUMENTS 9,403,429 B2 * 8/2016 Baumgartner ....... B60K 17/043
2002/0189397 A1 * 12/2002 Sakamoto ............ B60W 10/10
74/661

(Continued)

FOREIGN PATENT DOCUMENTS

CN 105515312 A 4/2016
CN 207523427 U 6/2018
(Continued)

OTHER PUBLICATIONS

Machine translated WO 2011060988 A1 (Year: 2011).*
(Continued)

*Primary Examiner* — Timothy Hannon
*Assistant Examiner* — Farhana Pervin
(74) *Attorney, Agent, or Firm* — Oblon, McClelland, Maier & Neustadt, L.L.P.

(57) ABSTRACT

A propulsion system for an electric vehicle includes a first electric propulsion motor including a stator and a rotor that has a first and second output shafts that are axially opposed and define first and second torque outputs of the first electric motor. The system also includes a second electric propulsion motor including a stator and a rotor having a second output shaft with a torque output. Further, the system includes a first reduction gearbox to receive the torque supplied on the first torque output of the first electric motor where appropriate via a first selective or non-selective coupling system, a second reduction gearbox to receive the torque supplied by the second electric motor where appropriate via a second selective or non-selective coupling system, and a third coupling system for coupling the second torque output of the first electric motor to the torque output of the second electric motor.

15 Claims, 5 Drawing Sheets (51) Int. Cl.
*B60K 17/02* (2006.01)
*F16H 3/089* (2006.01)
*B60K 7/00* (2006.01)
*F16H 37/08* (2006.01)
*F16H 37/04* (2006.01)

(52) U.S. Cl.
CPC .... *B60K 2007/0061* (2013.01); *F16H 37/043* (2013.01); *F16H 37/0813* (2013.01); *F16H 37/0833* (2013.01)

(58) Field of Classification Search
CPC ........... F16H 2200/0034; F16H 37/043; F16H 37/0833; B60K 17/16; B60K 1/02; B60K 17/02; B60K 2007/0061
See application file for complete search history.

(56) References Cited

U.S. PATENT DOCUMENTS

| | | | | |
|---|---|---|---|---|
| 2009/0250278 | A1* | 10/2009 | Kawasaki | B60K 6/543 903/910 |
| 2011/0139522 | A1* | 6/2011 | Takenaka | H02K 7/116 180/65.1 |
| 2013/0345019 | A1* | 12/2013 | Kaltenbach | B60W 20/40 903/902 |
| 2014/0004987 | A1* | 1/2014 | Sato | B60K 17/356 475/150 |
| 2014/0076102 | A1* | 3/2014 | Mazzini | B60K 1/02 74/665 B |
| 2019/0077247 | A1 | 3/2019 | Schwekutsch et al. | |
| 2019/0331200 | A1* | 10/2019 | Barendrecht | B60K 1/02 |

FOREIGN PATENT DOCUMENTS

| | | |
|---|---|---|
| DE | 44 34 237 A1 | 3/1996 |
| WO | WO 2011/060988 A1 | 5/2011 |
| WO | WO 2017/160702 A1 | 9/2017 |

OTHER PUBLICATIONS

Machine translation of WO 2017160702 A1 (Year: 2017).*
International Search Report dated Oct. 30, 2019 in PCT/EP2019/070834 filed on Aug. 1, 2019, 2 pages.
French Search Report with English translation of categories dated Jul. 24, 2019 in French Application No. 18 57279 filed on Aug. 3, 2018, 3 pages.

* cited by examiner

ELECTRIC VEHICLE PROPULSION SYSTEM

BACKGROUND OF THE INVENTION

Field of the Invention

The present invention relates to a propulsion system for an electric vehicle. Such a vehicle has purely electrical propulsion, having no propulsion combustion engine.

The invention relates in particular to a propulsion system for an electric vehicle comprising two distinct electric motors and two distinct reducers so as to be able to provide the user of the vehicle with a number of distinct modes of operation.

Description of the Related Art

Such a propulsion system is known for example from utility certificate FR 2 976 142. The propulsion system according to that utility certificate offers four different modes of operation, namely: (i) operation in the gear ratio of the first reducer using the first electric motor alone, (ii) operation in the gear ratio of the second reducer using the second electric motor alone, (iii) operation in the gear ratio of the first reducer using both electric motors, and (iv) operation in the gear ratio of the second reducer using both electric motors. The system according to that utility certificate FR 2 976 142 offers, for each electric motor, just one torque output arranged on the drive shaft on one side of the stator of this electric motor. Such an architecture dictates that the selective-coupling systems that allow the switch from one mode of operation to another have to be positioned downstream of the reducers, in the path of the torque generated by the electric motors.

There is still a need to further improve electric vehicle propulsion systems having two electric motors and two reducers.

BRIEF SUMMARY OF THE INVENTION

The invention aims to meet this need and does so, according to one of its aspects, using a propulsion system for an electric vehicle, comprising:
- a first electric propulsion motor comprising a stator and a rotor able to rotate about an axis, this rotor having a first output shaft defining a first torque output of this first electric motor on one side of the stator and a second torque output of this first electric motor which output is arranged on another side of the stator, these two torque outputs being axially opposed,
- a second electric propulsion motor comprising a stator and a rotor able to rotate about an axis, this rotor having a second output shaft with at least one torque output,
- at least a first reducer able to receive the torque supplied on the first output of the first electric motor, where appropriate via a first selective or non-selective coupling system, this first reducer having a first reduction ratio,
- at least a second reducer able to receive the torque supplied by the second electric motor, where appropriate via a second selective or non-selective coupling system, this second reducer having a second reduction ratio, and
- a third coupling system, which may or may not be selective, for coupling the second torque output of the first electric motor to the torque output of the second electric motor.

The above-mentioned propulsion system makes it possible to be able, if necessary, to position any first and second coupling system there might be upstream of the respective reducer. This then offers a wider choice if there is a desire to fit selective or non-selective coupling systems.

Within the meaning of the present application:
- a coupling system coupling two components is selective when it allows the two components to be coupled or uncoupled according to the instruction received,
- a coupling system coupling two components and which is not selective permanently couples these two components,
- two components coupled by one of the aforementioned coupling systems are secured to one another such that they rotate as one. This securing may correspond to torque lockup in instances in which the coupling system employs a dog clutch and this securing may employ a friction transmission in instances in which the coupling system employs a clutch, and
- "upstream" and "downstream" are defined with respect to the direction of torque transfer from an electric motor toward the wheels of the vehicle.

The first reducer may be connected to the first output of the first electric motor via a first selective or non-selective coupling system. Such an arrangement of the first reducer with respect to the first coupling system makes it possible to limit the value of the torque that this first coupling system has to transmit so that the bulkiness and/or the weight and/or the cost of this first coupling system can be reduced.

In a variant, the first selective or non-selective coupling system is connected to the first output of the first electric motor via the first reducer.

According to a first embodiment, the second output shaft has a first torque output on one side of the stator and a second torque output on another side of the stator, these two torque outputs being axially opposed.

According to this first embodiment, the second reducer may be connected to the first torque output of the second electric motor, notably via the second coupling system, and the second torque output of this second electric motor is coupled via the third coupling system to the second torque output of the first electric motor. In a way similar to that mentioned with reference to the first coupling system, positioning the second coupling system upstream of the second reducer makes it possible to limit the value of the torque that this second coupling system has to transmit.

As a variant, and still according to this first embodiment, the second coupling system is connected to the first torque output of the second electric motor via the second reducer, and the second torque output of this second electric motor is coupled via the third coupling system to the second torque output of the first electric motor.

In other words, according to this first embodiment, each output shaft of an electric motor passes all the way through, and each electric motor has two torque outputs which are axially opposed.

According to this first embodiment, the second torque output of the first electric motor may be the torque output that faces toward the second electric motor, and the second torque output of the second electric motor may be the torque output that faces toward the first electric motor.

According to a second embodiment, the second output shaft may have its torque output on just one side of the stator and this torque output may be connected to the second reducer, where appropriate via the second coupling system, and this torque output may be coupled to the second torque output of the first electric motor via the third coupling system.

In this case, the torque output of the second electric motor may be a single output connected: to the second coupling system and to the third coupling system, these systems being directed along parallel torque paths. In this case, the first output shaft may be axially in the continuation of the second output shaft. Again in this case, the first coupling system may be concentric with the second coupling system. The first coupling system and the second coupling system are, for example, grouped together within a dual clutch, for example a dry clutch or a wet clutch. Each of these clutches may comprise a plurality of friction plates.

Throughout the foregoing, the first reducer may be a single reducer and the second reducer may be a single reducer. The ratio between the first reduction gear-ratio and the second reduction gear-ratio may be comprised between 1 and 5, notably between 1.1 and 3.

In the case of a propulsion system with a single first reducer, the propulsion system may comprise a selection member for selecting the first reducer, allowing this reducer to be coupled selectively to the rest of the propulsion system. When the first coupling system connects the first reducer and the first torque output of the first electric motor, and this first reducer is uncoupled from this first torque output, such a selection member makes it possible to avoid driving this first reducer from the downstream side. That then means that this first reducer can achieve a fully uncoupled state. Where appropriate, such a selection member may be present even though no first coupling system is present. The cost of the propulsion system can thus be reduced by saving on the first coupling system.

In the case of a propulsion system with a single second reducer, the propulsion system may comprise a selection member for selecting the second reducer, allowing this reducer to be coupled selectively to the rest of the propulsion system. When the second uncoupling system connects the second reducer and the first output of the second electric motor, and this second reducer is uncoupled from this first output, such a selection member makes it possible to avoid driving this second reducer from the downstream side from the point of view of the path followed by the torque. That then means that this second reducer can achieve a fully uncoupled state. Where appropriate, such a selection member may be present even though no second coupling system is present. The cost of the propulsion system can thus be reduced by saving on the first coupling system.

As a variant, several first reducers, notably two first reduceres, with first reduction gear ratios that differ from one first reducer to the other, may be arranged in parallel and/or several second reducers, notably two second reducers, with second reduction gear ratios that differ from one second reducer to the other, may be arranged in parallel. The number of first reducers may or may not be the same as the number of second reducers.

When there are several first reducers in parallel, a member for selecting one of these first reducers may be provided, so as to select the first reducer that has the most appropriate first reduction gear ratio.

When there are several second reducers in parallel, a member for selecting one of these second reducers may be provided, so as to select the second reducer that has the most appropriate second reduction gear ratio.

In the case of a propulsion system having several first reducers and/or having several second reducers, it is possible where appropriate to have no first coupling system and no second coupling system, the aforementioned selection members then alone performing the selective-coupling function.

In the case of several first reducers and several second reducers, the ratio between the highest reduction gear ratio and the lowest reduction gear ratio, considered across all of the first and second reducers, may be comprised between 1 and 5, notably being comprised between 1.1 and 3.

When two first reducers are in parallel and two second reducers are in parallel, it is possible to obtain a propulsion system having four different gear ratios.

Each coupling system for example employs a clutch. The choice of a clutch makes it possible to enjoy coupling and uncoupling that are progressive.

When the first coupling system and the second coupling system employ clutches, and notably according to the second embodiment hereinabove, the first and the second coupling system may be grouped together within a dry dual clutch or a wet dual clutch.

In a variant, each coupling system may be of another type, for example employing a dog clutch or another system. In yet another variant, the coupling systems may be of different types compared with one another.

The first coupling system and the second coupling system for example employ a clutch, and the third coupling system employs a dog clutch, or this third coupling system is not selective.

In yet another variant, the first coupling system and the second coupling system employ a dog clutch, and the third coupling system employs for example a clutch, or dog clutch, or a non-selective coupling system.

Whether the first and second coupling systems employ a clutch or dog clutch, the third coupling system may be chosen from:
  the assembly made up of: a pinion gear rotationally secured to rotate as one with a torque output of one of the two electric motors, and meshing with a first idling pinion gear mounted with the ability to rotate freely on an intermediate shaft, a pinion gear secured to rotate as one with a torque output of the other of the two electric motors and meshing with a second pinion gear secured to rotate as one with the intermediate shaft, and a coupling member for the selective or non-selective coupling of the first pinion gear and of the second pinion gear, this coupling member being, for example, a dog clutch, or
  the assembly made up of: an idling pinion gear mounted with the ability to rotate freely on a torque output of one of the two electric motors, this idling pinion gear meshing with a first pinion gear secured to rotate as one with an intermediate shaft, a pinion gear secured to rotate as one with a torque output of the other of the two electric motors and meshing with a second pinion gear secured to rotate as one with the intermediate shaft, and a coupling member for the selective coupling of the idling pinion gear and of the torque output of the electric motor on which output this idling pinion gear is mounted, this coupling member being, for example, a dog clutch, or
  the assembly made up of: an idling sprocket gear mounted with the ability to rotate freely on a torque output of one of the two electric motors, this sprocket gear meshing with a chain, and a sprocket gear secured to rotate as one with a torque output of the other of the two electric motors and meshing with the chain, and a coupling member for the selective coupling of the idling sprocket gear with the output of the electric motor on which output this idling sprocket gear is mounted, this coupling member being, for example, a dog clutch, or the assembly made up of: a sprocket gear secured to rotate as one with the second torque output of the first electric motor, a sprocket gear secured to rotate as one with a torque output of the second electric motor, and a chain meshing with each of these sprocket gears. No selective-coupling member is provided here, the third coupling system not being selective in this latter variant.

As a further variant, the third coupling system may be a permanent rigid connection, the first output shaft being for example fixed directly to the second output shaft.

Throughout the foregoing, the axis of rotation of the first output shaft may be coincident with the axis of rotation of the second output shaft. In that case, the second torque output of the first electric motor may face toward the second electric motor, and the second torque output of the second motor may face toward the first electric motor. The first output shaft and the second output shaft may therefore be arranged in the continuation of one another. The axes of rotation are therefore aligned.

In a variant, throughout the foregoing, the axis of rotation of the first output shaft and the axis of rotation of the second output shaft may be distinct, notably being parallel but not coincident or not aligned.

Throughout the foregoing, the propulsion system may comprise a differential arranged in such a way as to receive at least one of: the torque passing via the first reducer, and the torque passing via the second reducer. This differential may be a mechanical differential or an electronic differential controlling the drive torque fed to each driven wheel of the vehicle.

Where appropriate, one or more intermediate gear wheels may be arranged downstream of each of the first and second reducers, and upstream of the differential. These gear wheels, which are common to the path of the torque passing via the first reducer(s) and to the path of the torque passing through the second reducer(s) may or may not form an additional reduction gear ratio. In a variant, no additional gear wheel is arranged between the first reducer(s) and the differential, or between the second reducer(s) and the differential.

Throughout the foregoing, when the propulsion system comprises three coupling systems, this propulsion system may also comprise a control member for controlling the first, second and third coupling system, so that the system can adopt all or some of the following configurations:
- a configuration whereby the differential receives the torque passing via the first reducer, this torque being generated by the first electric motor,
- a configuration whereby the differential receives the torque passing via the second reducer, this torque being generated by the second electric motor,
- a configuration whereby the differential receives the torque passing via the first reducer, this torque being generated by the first electric motor, and also the torque passing via the second reducer, this torque being generated by the second electric motor,
- a configuration whereby the differential receives the torque passing via the first reducer, this torque being generated by the first electric motor, and by the second electric motor or, where appropriate, only by the second electric motor,
- a configuration whereby the differential receives the torque passing via the second reducer, this torque being generated by the first electric motor, and by the second electric motor or, where appropriate, only by the first electric motor, and
- a parking-brake configuration in which the three coupling systems are in the coupled configuration.

When a selection member for the first reducer(s) and/or when a selection member for the second reducer(s) exist(s), the control member above can also control this or these selection members.

The control member is incorporated for example into the vehicle processor (ECU). In a variant, the control member is incorporated into the transmission control unit (TCU). As a further variant, the control member may be modular and the control module for controlling the first and second coupling system is incorporated into the transmission control unit whereas the control module for controlling the third coupling system is incorporated into the ECU.

Throughout the foregoing, the ratio between the nominal torque supplied by the first electric motor and the nominal torque supplied by the second electric motor may be comprised between 1 and 10, for example being comprised between 1 and 4.

The first electric motor and the second electric motor are, for example, of the same type, for example wound-rotor or permanent-magnet synchronous machines. In a variant, they may for example be asynchronous machines.

Throughout the foregoing, when the propulsion system comprises the first coupling system, the second coupling system and the third coupling system, these systems may be distinct from one another. The third coupling system may be formed in full or in part by elements that are specific to it, namely one or more elements which belong neither to the first coupling system nor to the second coupling system.

BRIEF DESCRIPTION OF THE SEVERAL VIEWS OF THE DRAWINGS

The invention may be better understood on reading the following description of nonlimiting exemplary embodiments thereof and on studying the appended drawing, in which.

DETAILED DESCRIPTION OF THE INVENTION

Figure 1:
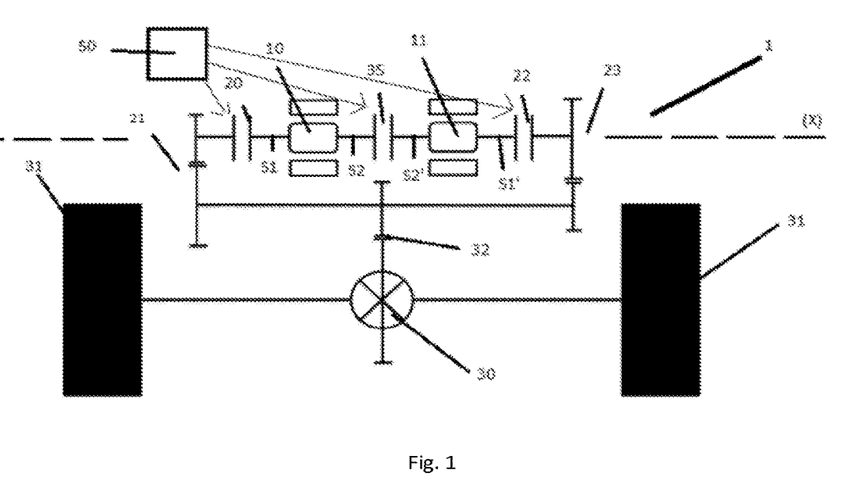
FIG. 1 schematically depicts a propulsion system according to a first embodiment of the invention.

FIG. 1 depicts a vehicle propulsion system 1 according to a first embodiment of the invention.

This propulsion system 1 is, in this instance, purely electrical, which means to say that it does not employ any combustion engine to drive the vehicle which in this instance is an automobile. This propulsion system 1 here comprises a first electric motor 10 and a second electric motor 11.

The first electric motor 10 and the second electric motor 11 are, for example, permanent-magnet synchronous machines. The first electric motor 10 for example has a nominal torque of 50 Nm, while the second electric motor 11 for example has a nominal torque of 70 Nm. As can be seen in FIG. 1, each electric motor 10, 11 has, in the example described, a rotor having an output shaft rotating about an axis of rotation and extending axially on each side of the stator of the corresponding electric motor. In the example described, the axes of rotation of the first electric motor and of the second electric motor are coincident, the two electric motors 10 and 11 being aligned along this axis X.

The first electric motor 1 thus comprises a first torque output S1 arranged axially on one side of this motor and a second torque output S2 arranged axially on another side of this motor.

The second electric motor 2 comprises a first torque output S1' arranged axially on one side of this motor and a second torque output S2' arranged axially on another side of this motor.

It may be seen in FIG. 1 that the second output S2 of the first electric motor 10 faces toward the second electric motor 11 and that the second output S2' of the second electric motor 11 faces toward the first electric motor 10.

The first output S1 of the first electric motor is, according to this first embodiment, connected to a first coupling system 20 which in this instance is a selective-coupling system. This coupling system 20 is depicted in the form of a clutch in FIGS. 1 to 5, but could be produced in some other way, for example using a dog clutch.

This first coupling system 20 allows the first output S1 of the first electric motor 10 to be coupled to a first reducer 21 which, for example, has a reduction ratio of the order of 12.

The first output S1' of the second electric motor is, according to this first embodiment, connected to a second coupling system 22 which in this instance is a selective-coupling system. Similarly to that which was mentioned in respect of the first coupling system 20, this system is depicted in the form of a clutch in FIGS. 1 to 5, but could be produced in some other way, for example using a dog clutch.

Figure 10:
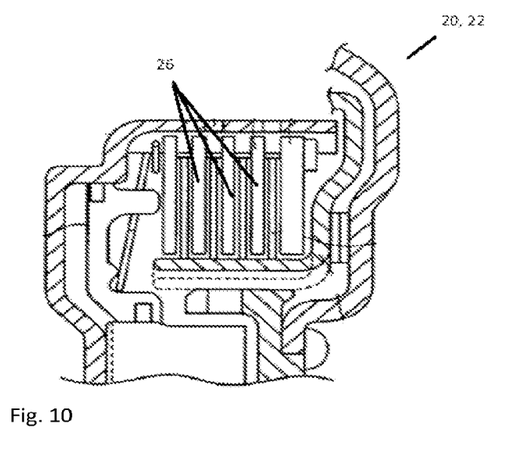
FIG. 10 depicts a clutch that can be used to create a first or second coupling system.

FIG. 10 depicts an example of a clutch suitable for embodying the first coupling system 20 or for embodying the second coupling system 22. This clutch in this instance is a plate clutch, these plates 26 becoming coupled in order to transmit torque, under the action of a mobile piston.

Figure 11:
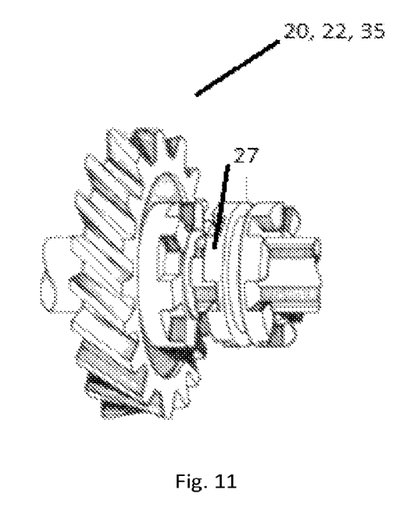
FIG. 11 depicts a dog clutch that can be used to create a first or second or third coupling system.

In a variant, each coupling system 20, 22 could employ a dog clutch, as depicted in FIG. 11. Such a coupling system allows two components to be coupled using dogs 27.

The second coupling system 22 allows the first output S1' of the second electric motor 11 to be coupled to a second reducer 23 which, for example, has a reduction ratio of the order of 8.

The invention is not restricted to the positioning of the first or, respectively, second, coupling system 20 or, respectively, 22, upstream of the first reducer 21 or, respectively, second reducer 23, in the path of the torque generated by the corresponding motor 10 or, respectively, 11. The first or, respectively, second, coupling system 20 or, respectively, 22, may, as a variant, be positioned downstream of the first reducer 21 or, respectively, second reducer 23, in the path of the torque generated by the corresponding motor 10 or, respectively, 11. Such another propulsion system with the reverse positioning of the reducer in comparison with the coupling system is visible for example in FIG. 2.

The propulsion system 1 further comprises a differential 30. In the examples considered, one or more gear wheels 32 are interposed between the first reducer(s) 21 and the differential 30 and between the second reducer(s) 23 and the differential 30. However, in variants, it is possible for no gear wheel to be provided.

Figure 2:
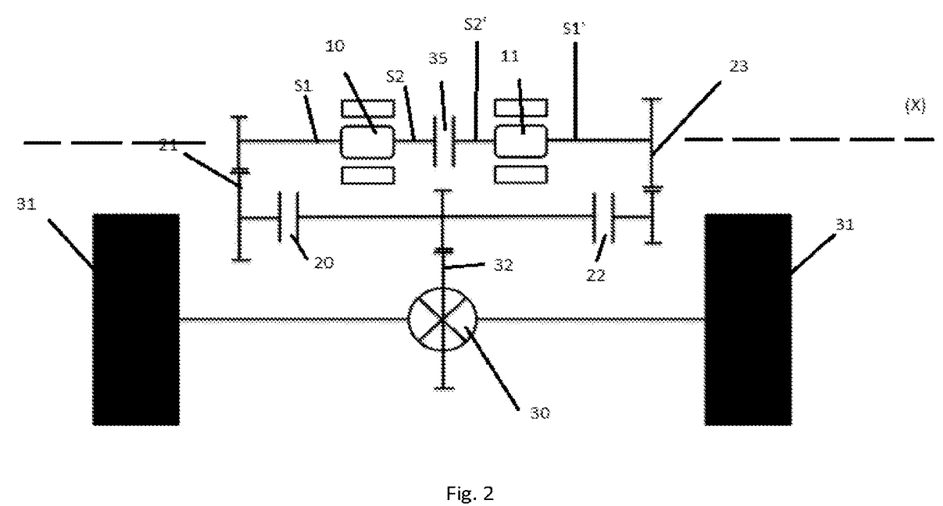
FIGS. 2 to 4 depict variants of the propulsion system of FIG. 1, FIG. 5 schematically depicts a propulsion system according to a second embodiment of the invention, FIGS. 6 to 9 schematically depict propulsion systems not covered by claim 1 but which are beneficial to an understanding of the invention.

In the example of FIGS. 1 and 2, the propulsion system 1 comprises just one single first reducer 21 and just one single second reducer 22, but the invention is not restricted to that scenario.

Figure 4:
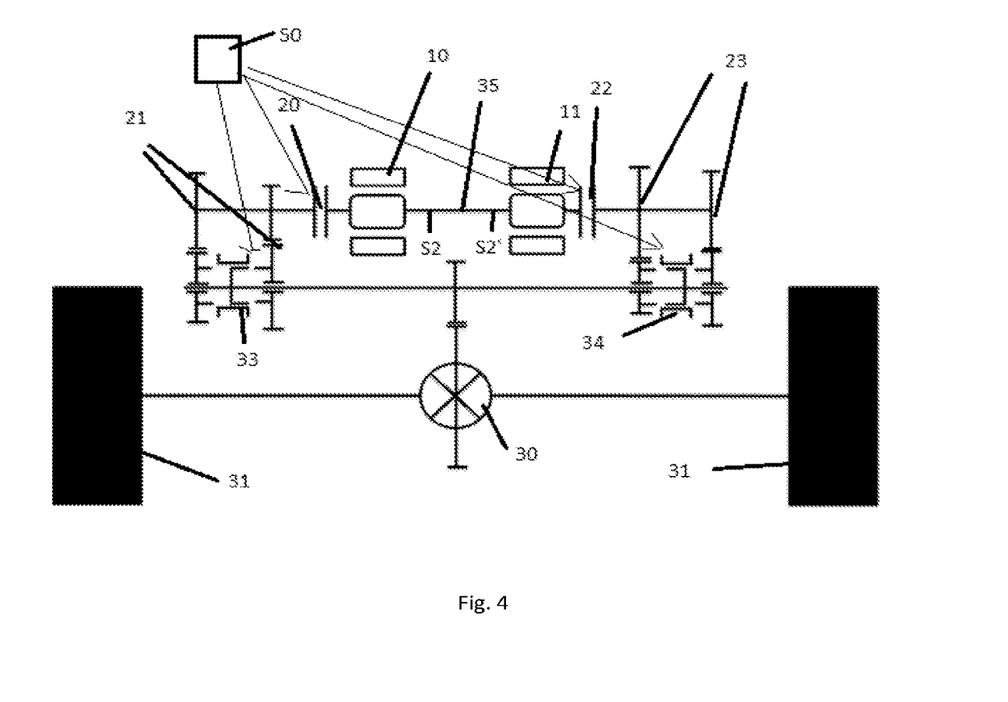

Thus, as depicted in FIG. 4, several first reducers 21 may be arranged in parallel between the first torque output S1 of the first electric motor and the differential 30, and several second reducers 23 may be arranged in parallel between the first torque output S1' of the second electric motor 11 and the differential 30.

As may be seen in FIG. 4, two first reducers 21 are in parallel here, and two second reducers 23 are in parallel. The two first reducers 21 here have a first reduction ratio that differs from one to the other, just like the two second reducers 23. Where appropriate, a selection member 33 for selecting one of the first reducers 21 and a selection member 34 for selecting one of the second reducers 23 may be provided. Each of these selection members 33, 34 is in this instance a dog clutch.

Figure 3:
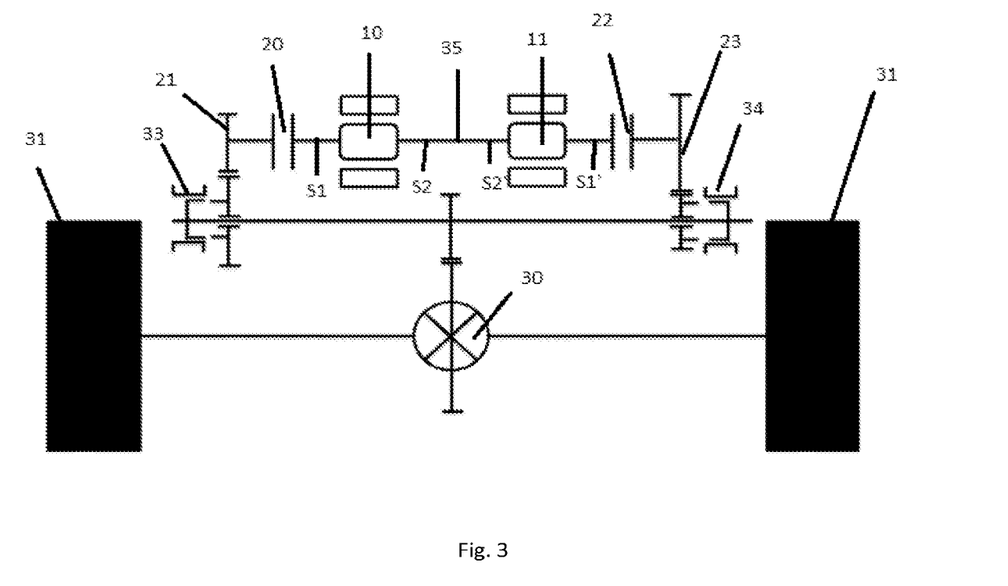

It is also possible for the selection members 33 and 34 to be present in instances in which the proportion system comprises a single first reducer 21 and a single second reducer 22, as can be seen in FIG. 3. This selection member 33, 34 therefore allows the corresponding reducer 21, 23 to be disconnected.

The differential 30 is arranged in such a way as to receive:
- the torque available on the first output S1 of the first electric motor 10, after passing via the first coupling system 20 and the first reducer 21 in the example described, and/or
- the torque available on the first output S1' of the second electric motor 11, after passing via the second coupling system 22 and the second reducer 23 in the example described.

The differential 30 allows the torque to be transmitted to the wheels 31.

As can be seen in FIGS. 1 to 4, the second output S2 of the first electric motor 10 is coupled to the second output ST of the second electric motor 11. This coupling is done via a third coupling system 35.

In FIGS. 1 and 2, this third coupling system 35 employs a clutch, for example similar to that of FIG. 10.

In FIGS. 3 and 4, this third coupling system 35 is not selective, being for example a belt or a direct connection of one output shaft to the other.

Figure 5:
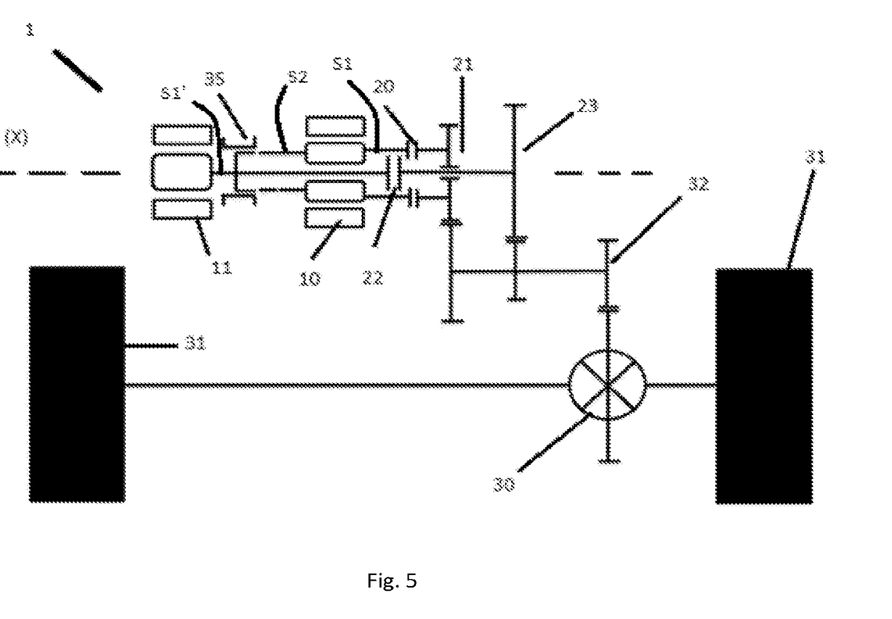

In FIG. 5, this third coupling system 35 employs a dog clutch, for example as depicted in FIG. 11.

Other examples for producing a selective or non-selective third coupling system are possible.

Figure 6:
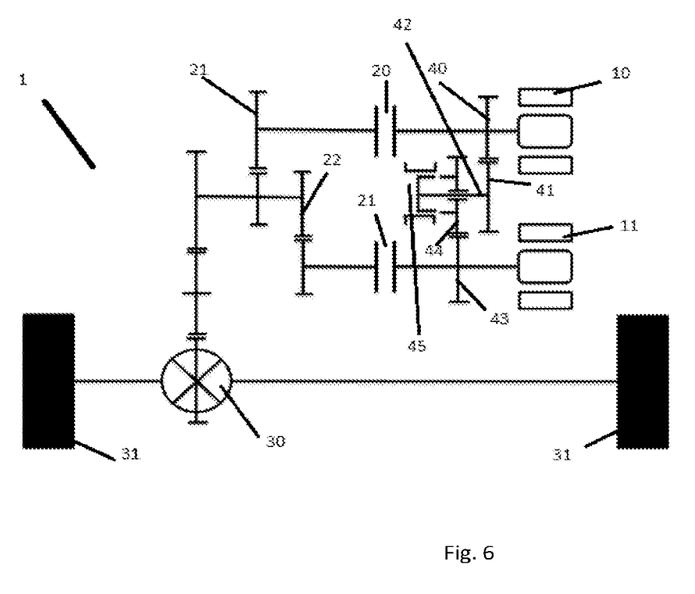

The third coupling system 35 is for example adapted from that depicted in FIG. 6. This FIG. 6 depicts a propulsion system 1 which comprises the same elements as the propulsion system of FIGS. 1 to 4, but arranged differently because each electric motor 10 or 11 comprises just one single torque output. Such a third coupling system 35 adapted from FIG. 6 to suit the examples of FIGS. 1 to 4 would be an assembly formed by: a pinion gear 40 which, by analogy with FIG. 6, would be secured to rotate as one with the second torque output S2 of the first electric motor 10, and meshing with a first pinion gear 41 secured to rotate as one with an intermediate shaft 42, a pinion gear 43 secured to rotate as one with the second torque output S2' of the second electric motor 11 and meshing with an idling second pinion gear 44 mounted to rotate freely on the intermediate shaft 42, and a dog clutch 45 forming a coupling member for the selective coupling of the first pinion gear 41 and of the second pinion gear 44.

Figure 7:
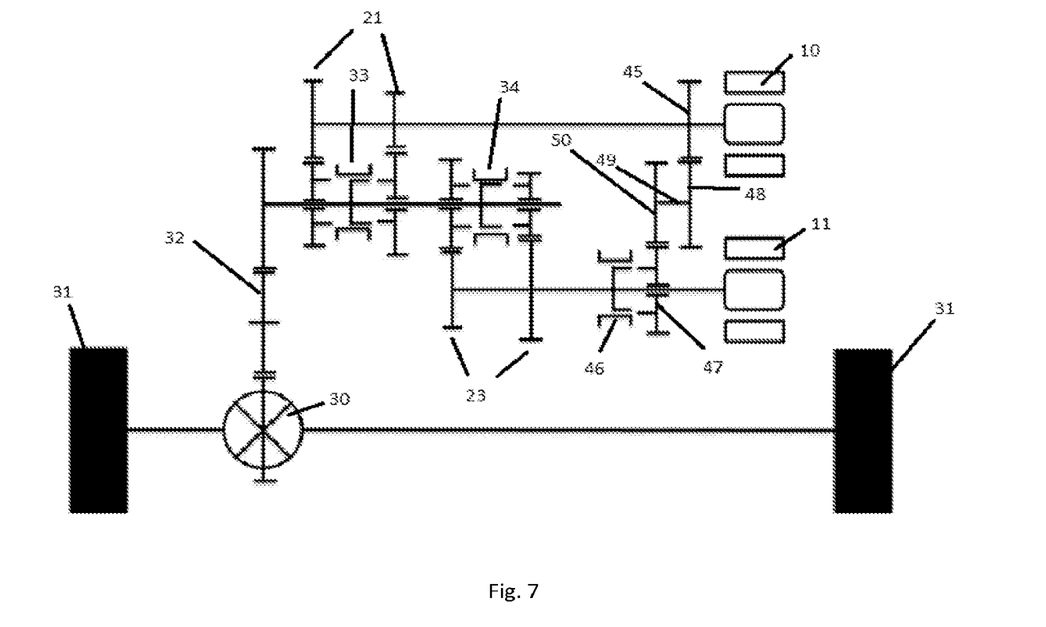

The third coupling system 35 may also be adapted from that depicted in FIG. 7. This FIG. 7 depicts a propulsion system 1 which comprises the same elements as the propulsion system of FIG. 1, but arranged differently because each electric motor 10 or 11 comprises just one single torque output. Such a coupling system 35, adapted from FIG. 7, would be an assembly formed by a pinion gear 45 secured to rotate as one with the second torque output S2 of the first electric motor 10, an idling pinion gear 47 mounted to rotate freely on the second torque output S2' of the second electric motor 11, a first pinion gear 48 secured to rotate as one with an intermediate shaft 49 and meshing with the pinion gear 45, a second pinion gear 50 secured to rotate as one with the intermediate shaft 49 and meshing with the pinion gear 47, and a dog clutch 46 allowing the pinion gear 47 to be selectively coupled to the torque output S2' on which it is mounted. In a variant, the pinion gears 48, 50 and the intermediate shaft 49 may be omitted, the idling pinion gear 47 meshing directly with the pinion gear 45. It may be noted from FIG. 7 that the first coupling system 20 and the second coupling system 22 here are replaced by the selection members 33 and 34.

Figure 8:
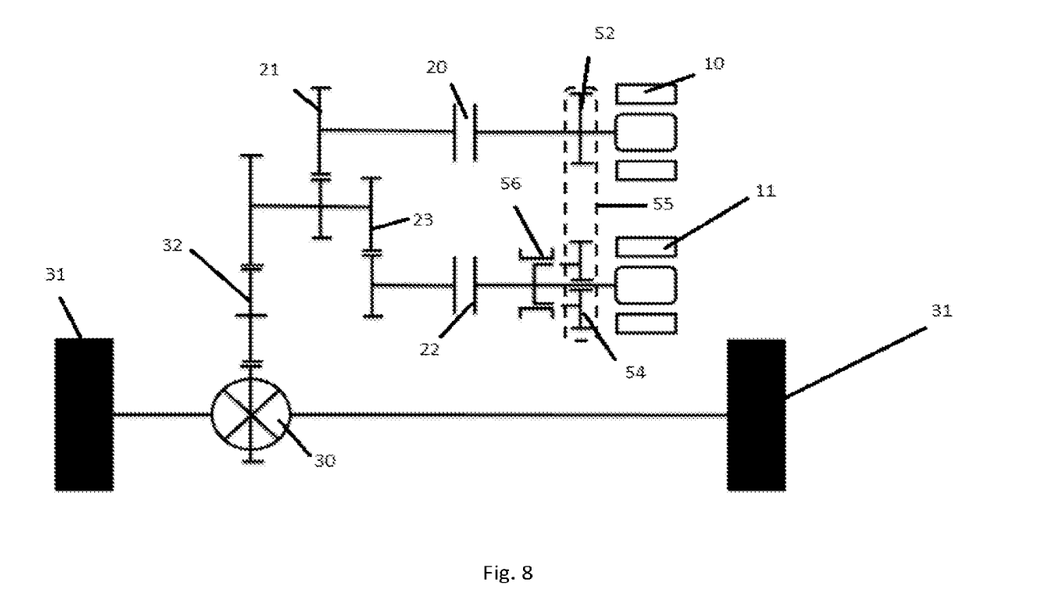

The third coupling system 35 may also be adapted from that depicted in FIG. 8. This FIG. 8 depicts a propulsion system 1 which comprises the same elements as the propulsion system of FIG. 1, but arranged differently because each electric motor 10 or 11 comprises just one single torque output. Such a coupling system 35, adapted from FIG. 8, would be an assembly formed by a sprocket gear 52 secured to rotate as one with the second torque output S2 of the first electric motor 10, an idling sprocket gear 54 mounted to rotate freely on the second torque output S2' of the second electric motor 11, and a chain 55 meshing with each sprocket gear 52 and 54. A dog clutch 56 is provided for selectively coupling the sprocket gear 54 to the torque output S2' on which it is mounted.

Figure 9:
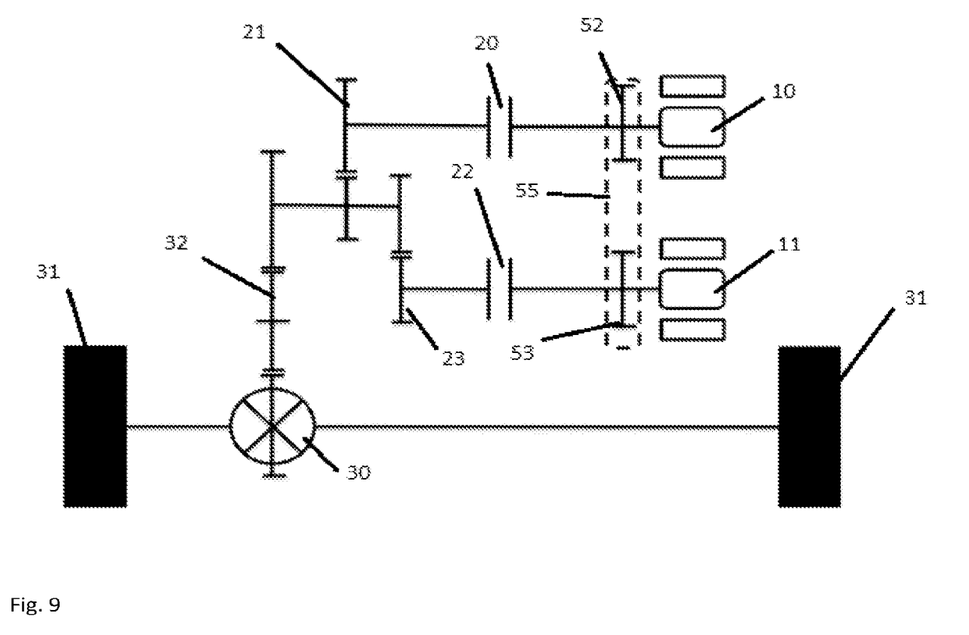

The third coupling system 35 may also be adapted from that depicted in FIG. 9. This FIG. 9 depicts a propulsion system 1 which comprises the same elements as the propulsion system of FIG. 1, but arranged differently because each electric motor 10 or 11 comprises just one single torque output. Such a coupling system 35, adapted from FIG. 9, is an assembly formed by a sprocket gear 52 secured to rotate as one with the second torque output S2 of the first electric motor 10, a sprocket gear 53 secured to rotate as one with the second torque output S2' of the second electric motor 11, and a chain 55 meshing with each sprocket gear 52 and 53. No selective-coupling means is provided here, the third coupling system 35 not being selective in this instance.

In yet another variant, the first coupling system 20 and the second coupling system 22 employ dog clutches, and the third coupling system 35 employs a clutch.

Throughout the foregoing, the propulsion system may further comprise a control member 50 for controlling the first 20, second 22 and third 35 coupling systems. When several first reducers 21 and/or several second reducers 23 are present, the control member 50 may also make it possible to select one of the reducers, where appropriate via a module specific to these first reducers or to these second reducers, this specific module operating a selection member 33 or 34 as mentioned hereinabove. As already mentioned, these selection members may be present with a single first reducer and a single second reducer, in which case they can be controlled by the control member 50, without there necessarily having to be a first coupling system 20 and a second coupling system 22.

The control member 50 is programmed so that the propulsion system of FIG. 1 can adopt the following configurations:
- a configuration (i) whereby the differential 30 receives the torque passing via the first reducer 21, this torque being generated by the first electric motor 10,
- a configuration (ii) whereby the differential 30 receives the torque passing via the second reducer 23, this torque being generated by the second electric motor 11,
- a configuration (iii) whereby the differential 30 receives the torque passing via the first reducer 21, this torque being generated by the first electric motor 10, and also the torque passing via the second reducer 23, this torque being generated by the second electric motor 11,
- a configuration (iv) whereby the differential 30 receives the torque passing via the first reducer 21, this torque being generated by the first electric motor 10, and by the second electric motor 11 or, where appropriate, only by the second electric motor 11 when the first electric motor 10 is switched off, and
- a configuration (v) whereby the differential receives the torque passing via the second reducer 23, this torque being generated by the first electric motor 10, and by the second electric motor 11 or, where appropriate, only by the first electric motor 10 when the second electric motor 11 is switched off, and
- a configuration (vi) whereby each coupling system 20, 22 and 35 is in a coupled position.

The commands used by the control member 50 to control the coupling systems in order to obtain the configurations (i) to (vi) above are given in the table below.

| Configuration | First coupling system (20) | Second coupling system (22) | Third coupling system (35) |
| --- | --- | --- | --- |
| (i) | Couple | Uncouple | Uncouple |
| (ii) | Uncouple | Couple | Uncouple |
| (iii) | Couple | Couple | Uncouple |
| (iv) | Couple | Uncouple | Couple |
| (v) | Uncouple | Couple | Couple |
| (vi) | Couple | Couple | Couple |

Configuration (i) is for example suited to low vehicle speeds with low torque demands.

Configuration (ii) is for example suited to high vehicle speeds with low torque demands.

Configuration (iii) is for example suited to transient speeds, for example when making the transition from one reduction ratio to another.

Configuration (iv) is for example suited to low vehicle speeds with high torque demands.

Configuration (v) is for example suited to high vehicle speeds with high torque demands.

Configuration (vi) is for example suited to operation as a parking brake.

A propulsion system according to a second embodiment of the invention will now be described with reference to FIG. 5.

This second embodiment differs from that described with reference to FIG. 1 in that the second electric motor 11 comprises just one single torque output S1'. This torque output S1' is, on the one hand, coupled selectively or otherwise via the second coupling system 22 to the second reducer 23 and, on the other hand, coupled selectively or otherwise via the third coupling system 35 to the first electric motor 10.

It may be seen in FIG. 5 that the first and the second coupling system may be concentric, the first coupling system 20 here being arranged around the second coupling system 22.

Each coupling system may be produced in accordance with that which has been described hereinabove. One of the three coupling systems 35 adapted from FIGS. 6 to 9 and described hereinabove can be used in the context of FIG. 5. It then differs from that described with reference to FIG. 1 in that the pinion gear 43, 47 or sprocket gear 53 or 54 is borne by the torque output S1' of the second electric motor 11.

The invention is not limited to the examples that have been described above.

The invention claimed is:

1. A propulsion system for an electric vehicle, comprising:
a first electric propulsion motor comprising a stator and a rotor configured to rotate about an axis, the rotor including a first output shaft defining a first torque output of the first electric motor on one side of the stator and a second torque output of the first electric motor which output is arranged on another side of the stator, the first and the second torque outputs being axially opposed;
a second electric propulsion motor comprising a stator and a rotor configured to rotate about an axis, the rotor of the second electric propulsion motor including a second output shaft with at least one torque output;
a first reducer configured to receive the torque supplied on the first torque output of the first electric motor, the first reducer including a first reduction ratio;
a second reducer configured to receive the torque supplied by the second electric motor, the second reducer including a second reduction ratio;
a coupling system, which may or may not be selective, configured to couple the second torque output of the first electric motor to the torque output of the second electric motor; and
a differential arranged in such a way as to receive at least one of: the torque passing via the first reducer, and the torque passing via the second reducer,
wherein the first reducer is connected to the first torque output of the first electric motor via a first selective coupling system, or the propulsion system comprises a first selective coupling system connected to the first torque output via the first reducer, and
wherein the propulsion system lacks a combustion engine.

2. The system as claimed in claim 1, wherein the coupling system employs a clutch.

3. The system as claimed in claim 1, wherein the second output shaft includes a first torque output on one side of the stator and a second torque output on another side of the stator, the first and second torque outputs of the second output shaft being axially opposed,
wherein the second reducer is connected to the first torque output of the second electric motor, and the second torque output of the second electric motor is coupled via the coupling system to the second torque output of the first electric motor,
wherein the second reducer is connected to the first torque output of the second electric motor via a second coupling system, or the propulsion system comprises a second coupling system connected to the first torque output of the second electric motor via the second reducer,
wherein the first selective coupling system and the second coupling system are different from each other and each employ a clutch, and
wherein the coupling system employs a dog clutch or is non-selective.

4. The system as claimed in claim 1,
wherein the torque output of the second output shaft is on just one side of the stator and the torque output of the second output shaft is connected to the second reducer and is coupled to the second torque output of the first electric motor via the coupling system,
wherein the torque output of the second output shaft is connected to the second reducer via a second selective coupling system, or the system comprises a second selective coupling system connected to the torque output of the second output shaft via the second reducer,
wherein the first selective coupling system and the second selective coupling system employ a clutch, and
wherein the coupling system employs a dog clutch or is non-selective.

5. The system as claimed in claim 1,
wherein the second output shaft includes a first torque output on one side of the stator and a second torque output on another side of the stator, the first and second torque outputs of the second output shaft being axially opposed,
wherein the second reducer is connected to the first torque output of the second electric motor, and the second torque output of the second electric motor is coupled via the coupling system to the second torque output of the first electric motor,
wherein the second reducer is connected to the first torque output of the second electric motor via a second coupling system, or the propulsion system comprises a second coupling system connected to the first torque output of the second electric motor via the second reducer,
wherein the first selective coupling system and the second coupling system are different from each other, each of the first selective coupling system and the second coupling system employing a dog clutch, and
wherein the coupling system employs a dog clutch or is non-selective.

6. The system as claimed in claim 1,
wherein the torque output of the second output shaft is on just one side of the stator and the torque output of the second output shaft is connected to the second reducer and is coupled to the second torque output of the first electric motor via the coupling system,
wherein the torque output of the second output shaft is connected to the second reducer via a second selective coupling system, or the system comprises a second selective coupling system connected to the torque output of the second output shaft via the second reducer,
wherein the first selective coupling system and the second coupling system employ a dog clutch, and
wherein the coupling system employs a dog clutch or is non-selective.

7. The system as claimed in claim 1, wherein the axis of rotation of the first output shaft is coincident with the axis of rotation of the second output shaft.

8. The system as claimed in claim 1, wherein a plurality of first reducers with first reduction gear ratios that differ from one first reducer to the other are arranged in parallel and/or a plurality of second reducers with second reduction gear ratios that differ from one second reducer to the other are arranged in parallel.

9. The system as claimed in claim 1, wherein two first reducers with first reduction gear ratios that differ from one another are arranged in parallel and/or two second reducers with second reduction gear ratios that differ from one another are arranged in parallel.

10. A propulsion system for an electric vehicle, comprising:
a first electric propulsion motor comprising a stator and a rotor configured to rotate about an axis, the rotor including a first output shaft defining a first torque output of the first electric motor on one side of the stator and a second torque output of the first electric motor which output is arranged on another side of the stator, the first and the second torque outputs being axially opposed;
a second electric propulsion motor comprising a stator and a rotor configured to rotate about an axis, the rotor of the second electric propulsion motor including a second output shaft with at least one torque output;
a first reducer configured to receive the torque supplied on the first torque output of the first electric motor, the first reducer including a first reduction ratio;
a second reducer configured to receive the torque supplied by the second electric motor, the second reducer including a second reduction ratio;
a coupling system, which may or may not be selective, configured to couple the second torque output of the first electric motor to the torque output of the second electric motor; and
a differential arranged in such a way as to receive at least one of: the torque passing via the first reducer, and the torque passing via the second reducer,
wherein the second output shaft includes a first torque output on one side of the stator and a second torque output on another side of the stator, the first and second torque outputs of the second output shaft being axially opposed, and
wherein the propulsion system lacks a combustion engine.

11. The propulsion system as claimed in claim 10, wherein the second reducer is connected to the first torque output of the second electric motor, and the second torque output of the second electric motor is coupled via the coupling system to the second torque output of the first electric motor.

12. The propulsion system as claimed in claim 11, wherein the second reducer is connected to the first torque output of the second electric motor via a second coupling system, or the propulsion system comprises a second coupling system connected to the first torque output of the second electric motor via the second reducer.

13. The system as claimed in claim 10,
wherein the first reducer is connected to the first torque output of the first electric motor via a first selective or non-selective coupling system, or the propulsion system comprises a first selective or non-selective coupling system connected to the first torque output via the first reducer,
wherein the second reducer is connected to the first torque output of the second electric motor, and the second torque output of the second electric motor is coupled via the coupling system to the second torque output of the first electric motor,
wherein the second reducer is connected to the first torque output of the second electric motor via a second coupling system, or the propulsion system comprises a second coupling system connected to the first torque output of the second electric motor via the second reducer,
wherein at least one of the first coupling system, the second coupling system, and the coupling system is a selective coupling system, and
wherein the system further comprises a control member configured to control the first selective or non-selective coupling system, the second coupling system, and the coupling system so that the propulsion system can adopt all or some of the following configurations:
a configuration whereby the differential receives the torque passing via the first reducer, the torque passing via the first reducer being generated by the first electric motor,
a configuration whereby the differential receives the torque passing via the second reducer, the torque passing via the second reducer being generated by the second electric motor,
a configuration whereby the differential receives the torque passing via the first reducer, the torque passing via the first reducer being generated by the first electric motor, and also the torque passing via the second reducer, the torque passing via the second reducer being generated by the second electric motor,
a configuration whereby the differential receives the torque passing via the first reducer, the torque passing via the first reducer being generated by the first electric motor, and by the second electric motor or, being generated only by the second electric motor, and
a configuration whereby the differential receives the torque passing via the second reducer, the torque passing via the second reducer being generated by the first electric motor, and by the second electric motor or, being generated only by the first electric motor, and
a parking-brake configuration in which the first selective or non-selective coupling system, the second coupling system, and the coupling system are in the coupled configuration.

14. A propulsion system for an electric vehicle, comprising:
a first electric propulsion motor comprising a stator and a rotor configured to rotate about an axis, the rotor including a first output shaft defining a first torque output of the first electric motor on one side of the stator and a second torque output of the first electric motor which output is arranged on another side of the stator, the first and the second torque outputs being axially opposed;
a second electric propulsion motor comprising a stator and a rotor configured to rotate about an axis, the rotor of the second electric propulsion motor including a second output shaft with at least one torque output;
a first reducer configured to receive the torque supplied on the first torque output of the first electric motor, the first reducer including a first reduction ratio;
a second reducer configured to receive the torque supplied by the second electric motor, the second reducer including a second reduction ratio;
a coupling system, which may or may not be selective, configured to couple the second torque output of the first electric motor to the torque output of the second electric motor; and a differential arranged in such a way as to receive at least one of: the torque passing via the first reducer, and the torque passing via the second reducer, wherein the torque output of the second output shaft is on just one side of the stator and the torque output of the second output shaft is connected to the second reducer and is coupled to the second torque output of the first electric motor via the coupling system, wherein the torque output of the second output shaft is connected to the second reducer via a second selective coupling system, or the system comprises a second selective coupling system connected to the torque output of the second output shaft via the second reducer, and wherein the propulsion system lacks a combustion engine.

15. The system as claimed in claim 14, wherein the first reducer is connected to the first torque output of the first electric motor via a first selective or non-selective coupling system, or the propulsion system comprises a first selective or non-selective coupling system connected to the first torque output via the first reducer, wherein at least one of the first selective or non-selective coupling system, the second coupling system, and the coupling system is a selective coupling system, and wherein the system further comprises a control member configured to control the first selective or non-selective coupling system, the second coupling system, and the coupling system so that the propulsion system can adopt all or some of the following configurations:

a configuration whereby the differential receives the torque passing via the first reducer, the torque passing via the first reducer being generated by the first electric motor, a configuration whereby the differential receives the torque passing via the second reducer, the torque passing via the second reducer being generated by the second electric motor, a configuration whereby the differential receives the torque passing via the first reducer, the torque passing via the first reducer being generated by the first electric motor, and also the torque passing via the second reducer, the torque passing via the second reducer being generated by the second electric motor, a configuration whereby the differential receives the torque passing via the first reducer, the torque passing via the first reducer being generated by the first electric motor, and by the second electric motor or, being generated only by the second electric motor, and a configuration whereby the differential receives the torque passing via the second reducer, the torque passing via the second reducer being generated by the first electric motor, and by the second electric motor or, being generated only by the first electric motor, and a parking-brake configuration in which the first selective or non-selective coupling system, the second coupling system, and the coupling system are in the coupled configuration.

* * * * *